United States Patent [19]

Salem et al.

[11] E Re. 29,680

[45] Reissued Jun. 27, 1978

[54] REGENERATION OF ANION EXCHANGE RESINS

[75] Inventors: Eli Salem, Brooklyn, N.Y.; Donald J. Butterworth, Lyndhurst; Leo F. Ryan, Sommerville, both of N.J.

[73] Assignee: Ecodyne Corp., Chicago, Ill.

[21] Appl. No.: 310,383

[22] Filed: Nov. 29, 1972

Related U.S. Patent Documents

Reissue of:

[64] Patent No.: 3,645,921
Issued: Feb. 29, 1972
Appl. No.: 30,058
Filed: Apr. 20, 1970

[51] Int. Cl.[2] ..... C08J 5/20

[52] U.S. Cl. ..... 260/2.1 R; 210/34; 260/2.1 E

[58] Field of Search ..... 260/2.1

[56] References Cited

U.S. PATENT DOCUMENTS 2,723,245 11/1955 Wheaton ..... 260/2.1 R

OTHER PUBLICATIONS

Gorshkov et al., Zh. Fiz. Khim., 1968, pp. 1992–1997.
Toma et al., Ind. Aliment. 28 (1), pp. 35–36 (1967).

*Primary Examiner*—Harold D. Anderson
*Attorney, Agent, or Firm*—Hume, Clement, Brinks, Willian & Olds, Ltd.

[57] ABSTRACT

The invention relates to a method for converting strong-base anion exchange resins from the monovalent anion form to the hydroxide form. A [solution] *source* of polyvalent anions is first passed through the resin to displace the monovalent anions. A solution of alkali metal hydroxide is then passed through the resin to convert it to the hydroxide form, and to produce an effluent solution of hydroxide ions and polyvalent anions. This effluent solution is then neutralized with an acid containing *a source of* polyvalent anions, and the neutralized solution is passed through a second batch of resin in the monovalent anion form. In the preferred embodiment, a portion of the effluent is retained without neutralization and is delivered to the second batch of resin after the neutralized effluent to perform a portion of the hydroxide regeneration.

11 Claims, 4 Drawing Figures

Filed April 20, 1970

REGENERATION OF ANION EXCHANGE RESINS

Figure 1:
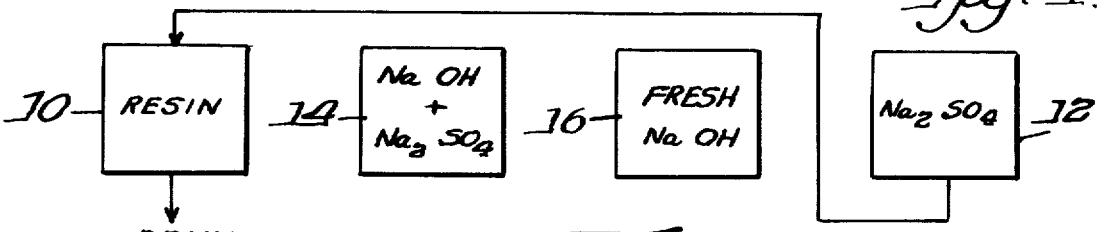

Matter enclosed in heavy brackets [ ] appears in the original patent but forms no part of this reissue specification; matter printed in italics indicates the additions made by reissue.

The present invention relates to an improved method for converting strong-base anion exchange resin having quaternary ammonium active groups from the monovalent anion form to the hydroxide form.

Strong base anion exchange resins having quaternary ammonium active groups are well known in the art. Such resins and the method for making them are described in U.S. Pats. Nos. 2,614,099 and 2,591,573. Such resins are prepared by reacting a tertiary amine with an insoluble cross-linked copolymer of a monovinyl aromatic hydrocarbon and a divinyl aromatic hydrocarbon such as a copolymer of styrene and divinylbenzene, or a copolymer of styrene, ethylvinylbenzene and divinylbenzene. Such a polymer contains halomethyl groups on its aromatic nuclei. Other anion exchange resins of the strongly basic quaternary ammonium type are described in U.S. Pats. 2,597,440 and 2,597,494. Such resins comprise the reaction product of a tertiary amine and a haloalkylated insoluble copolymer of one or more vinyl aromatic compounds such as styrene or vinylanisole and a minor proportion of a polyolefinic compound such as divinylbenzene, isoprene, butadiene, and trivinylbenzene with one another to form a product containing quaternary ammonium substitute groups on the aromatic nuclei. The strongly basic quaternary ammonium anion exchange resins are prepared by haloalkylating, preferably chloromethylating, an insoluble vinyl aromatic resin and reacting the haloalkylated product with a tertiary amine such as triethyl amine, trimethyl amine, dimethylbenzyl amine, dimethylethanol amine, or dimethyl aniline. Other tertiary amines such as tributyl amine, N-methylmorphonine and pyridine are also useful, but the products are somewhat less stable than those made with the tertiary amines mentioned earlier.

The strongly basic quaternary ammonium amines exchange resins in their hydroxide form are extremely strong bases which neutralize acids, split salts, and exchange ions in a neutral to alkaline aqueous solution. Thus, when a solution of sodium chloride is passed through a column containing a quaternary ammonium anion exchange resin to its hydroxide form, the chloride ions of the salt solution are exchanged for the hydroxyl groups on the resin and the liquid leaves the column as a solution of sodium hydroxide.

In use, strong-base anion exchange resins of the type described are frequently exhausted by conversion from the hydroxide form to the monovalent anion form, e.g., the chloride, nitrate, bromide, etc., form. It is frequently desired to regenerate these resins to the hydroxide form so that they can be re-used.

In other applications, for example the condensate polishing process described in U.S. Pat. No. 3,250,703 to Levendusky, which is assigned to the assignee of this application, it is not ordinarily desired to regenerate the resin. Instead, this resin is supplied to filter elements as a precoat layer, and is discarded when exhausted. In such applications, however, the resin when initially employed to form a precoat layer is preferably in a very high state of regeneration. Since fresh strong-base quaternary ammonium-type anion exchange resins are generally supplied by the manufacturer in the chloride form, it is necessary to convert these resins to the hydroxide form prior to use.

It is known that anion exchange resins of the strong-base type having quaternary ammonium groups may be most efficiently regenerated from the monovalent anion (e.g. chloride) form to the hydroxide form by first converting the resin to a polyvalent anion form (including divalent forms), and then converting the resin to the hydroxide form. Such a method is described in U.S. Pat. No. 2,723,245.

In the context of the present invention, it will be understood that the term "monovalent anion form" refers to resin forms other than the hydroxide form. Examples of such monovalent anions include chloride, bromide, and nitrate. These monovalent anions are exchanged for hydroxide anions when the resin is exhausted, or occupy the ion exchange sites of fresh resin as supplied by the manufacturer.

Generally, the present invention relates to an improved method for converting strong-base anion exchange resin having quaternary ammonium active groups from the monovalent anion form to the hydroxide form. In carrying out the method, a [solution] *source* of polyvalent anions (i.e., anions having a negative charge of two or more) is passed through a first batch of resin to displace the monovalent anions [with the polyvalent anions]. Subsequently, a solution of alkali metal hydroxide is passed through the resin to convert the resin into the hydroxide form, and to produce an effluent solution comprising hydroxide anions and polyvalent anions. The effluent is neutralized with an acid containing *a source of* polyvalent anions in order to form a neutralized [solution] *source* of polyvalent anions. This neutralized solution is then passed through a second batch of resin in the monovalent anion form.

The "neutralized [solution] *source*" of polyvalent anions does not necessarily have neutral pH (i.e., a pH of 7) subsequent to the neutralization step. In fact, it is sometimes preferred that the polyvalent anion solution have an acid pH. Accordingly, it is to be understood that the term "neutralized [solution] *source*" refers to an alkali metal hydroxide solution that has had an acid added to it, and which may ultimately have a neutral, acidic, or even a basic pH. In any event, the pH after neutralization will be more acidic than the pH before neutralization.

It will also be understood in connection with the foregoing and following description of the invention that a resin can rarely if ever be converted so that all of its ion exchanges sites are in a particular form. Generally, the degree of conversion depends upon a number of factors including ion concentration, pH, and temperature. Thus, in referred to the conversion of a resin to a particular form, it should be borne in mind that such conversion refers only to the majority (usually the vast majority) of the ion exchange sites.

The invention, together with the objects and advantages thereof, will be best understood by reference to the following detailed description, taken together with the drawings, in which:

FIGS. 1–4 are flow diagrams illustrating a preferred embodiment of the present invention.

In the embodiment shown on the drawings, it has been assumed that the resin is initially in the chloride form. In regenerating the resin, it is first converted to the sulfate form in a sulfate regeneration step by treating it with sodium sulfate, and then to the hydroxide form in a hydroxide regeneration step by treating it with sodium hydroxide. Thus, the "polyvalent anion" employed is the sulfate anion, and the "alkali metal hydroxide" is sodium hydroxide.

Referring to FIG. 1, in the first step of the process the resin in a regeneration column 10 is treated by passing a dilute solution of sodium sulfate from a sodium sulfate storage unit 12 through the resin in order to convert it from the chloride form to the sulfate form. Sufficient sodium sulfate solution is employed to convert all of the ion exchange sites in the resin. Preferably the concentration of the polyvalent anions (sulfate in this instance) in the solution should be no greater than 0.5 normal.

Figure 2:
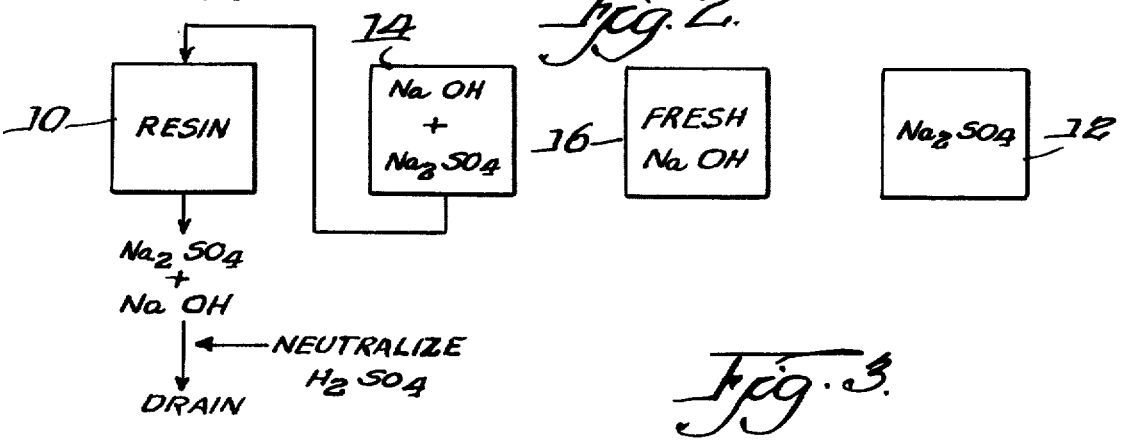

As shown in FIG. 2, after the resin has been converted to the sulfate form, a solution of sodium hydroxide and sodium sulfate is delivered from an effluent sodium hydroxide storage tank 14 through the resin in the regeneration column 10 to convert it to the hydroxide form. For reasons that will later appear, this solution comprises primarily sodium hydroxide, with only small amounts of sodium sulfate. The hydroxide ion concentration is not critical, and will generally be in the range of about 1 to 5 normal and preferably 3.5 to 5.0 normal. After the sodium hydroxide-sodium sulfate solution has passed through the resin, the effluent is delivered to the drain. Before being delivered to the drain, the effluent is preferably neutralized with an acid, in this instance sulfuric acid.

Figure 3:
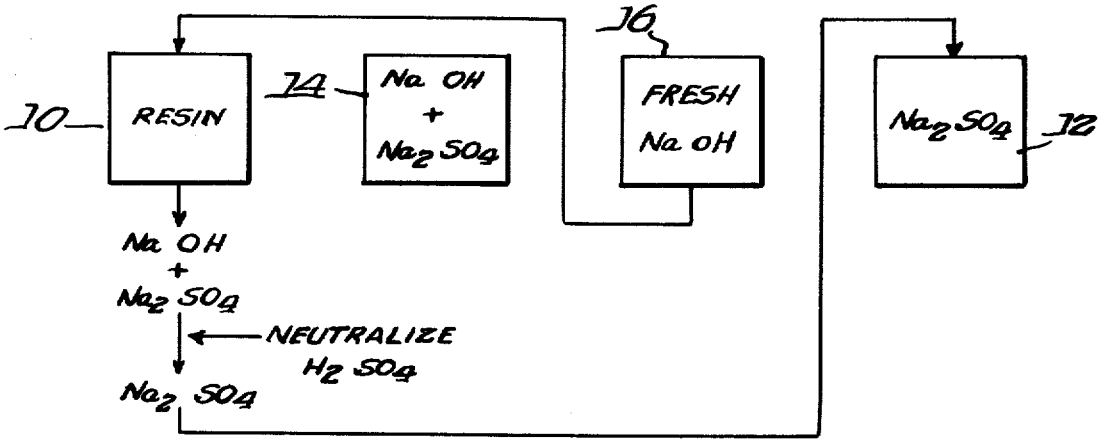

Referring to FIG. 3, fresh sodium hydroxide from a fresh sodium hydroxide storage tank 16 is next delivered to the resin. The effluent from the regeneration column 10 will be primarily sodium hydroxide, with a small amount of sodium sulfate formed when hydroxide ions are exchanged for sulfate ions in the resin. Only a small amount of sodium sulfate will ordinarily be formed, as the bulk of the sulfate anions is removed in the initial sodium hydroxide treatment described above and shown in FIG. 2. In the preferred embodiment of the present invention, concentrated sodium hydroxide is employed, preferably having a concentration in the range of about 3.5 to 5.0 normal.

Because such a sodium hydroxide solution in the range of 3.5 to 5.0 normal will ordinarily be more dense than the anion exchange resin, it is preferred that this regeneration step be performed in a downflow direction in a packed bed of the ion exchange resin. Such a procedure will prevent flotation of the resin during regeneration.

The effluent sodium hydroxide and sodium sulfate are neutralized with sulfuric acid to form a sodium sulfate solution, as shown in FIG. 3. This sodium sulfate solution is returned to the effluent sodium sulfate storage tank 12 for use in conversion of a second batch of resin to the sulfate form. Generally, it will be necessary to adjust the concentration of the sodium sulfate to the proper level, i.e., preferably 0.5 normal or less, although such adjustment need not be made at this time.

Figure 4:
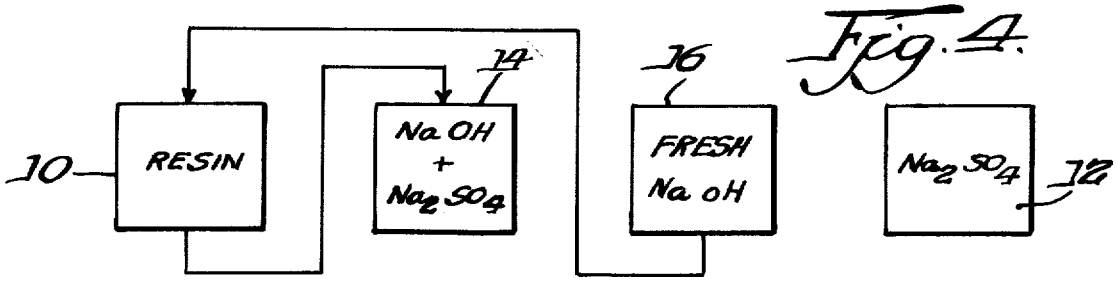

After sufficient sodium sulfate solution has been formed for conversion of a second batch of resin to the sulfate form, the flow of effluent from the resin tank is diverted to the effluent sodium hydroxide storage tank 14 as shown in FIG. 4. Since this effluent is from the sodium hydroxide delivered to the resin toward the end of the regeneration run, it will contain only very small amounts of sodium sulfate. This sodium hydroxide solution containing small amounts of sodium sulfate is stored for use in the initial portion of the hydroxide regeneration step for the next batch of resin.

The regenerated resin is now removed from the regeneration column 10, and a new batch in the monovalent anion (e.g. chloride) form is delivered. The above-described regeneration procedure is then repeated with this second batch of resin, and is continued for subsequent batches of resin.

As is clear from the foregoing description, a substantial advantage of the method of the present invention is in its economy. That is, rather than being entirely delivered to the drain, the sodium hydroxide passed through the resin is preserved. Part of this sodium hydroxide is converted to sodium sulfate by dilution, while the remainder is retained for use in the initial part of the regeneration of a subsequent batch of resin.

As previously stated, numerous *sources of* polyvalent anions may be employed in the method of the present invention. *These include ionizable substances that produce polyvalent anions in solution, as well as those that produce monovalent anions, such as bisulfate and bicarbonate, which in turn, are ionizable to form polyvalent anions.* These polyvalent anions are supplied by an inorganic compound, which should be a substance that readily ionizes in dilute aqueous solutions. Examples of suitable ionized substances are sodium sulfate, sodium carbonate, potassium sulfate, potassium carbonate, sodium phosphate, potassium bisulfate, sodium bicarbonate, monobasic sodium phosphate, dibasic sodium phosphate, and tetrasodium pyrophosphate. Examples of other inorganic compounds that may be employed are magnesium sulfate, calcium sulfate, ferrous sulfate, and zinc sulfate. Any water-soluble inorganic salt that ionizes in a dilute aqueous solution to provide polyvalent anions, particularly sulfate, carbonate, or phosphate anions, and that does not form insoluble substances with the monovalent anions displaced from the anion exchange resin may be employed in the process. Sodium sulfate, sodium carbonate, and sodium phosphate are the preferred compounds. As previously stated, the inorganic compound is preferably employed in a dilute solution, i.e., in a concentration not exceeding 0.5 normal and preferably in the range of about 0.01 to 0.2 normal.

The amount of solution containing *a source of* polyvalent anions that is employed should be sufficient to convert at least about 80% of the ion exchange sites [to the polyvalent salt form prior to treatment]. *Subsequently, the resin is treated* with an aqueous solution of an alkali metal hydroxide to convert the resin to its hydroxide form. As a general matter, the polyvalent anions are usually supplied to the resins in an amount corresponding to about 1 to 4 times the chemical equivalent capacity of the anion exchange resin.

The [solution containing divalent] *source of polyvalent* anions is ordinarily fed to the resin bed at a rate corresponding to about 1 to 5 gallons of solution per square foot of cross section of the resin bed per minute. This cross section is measured perpendicularly to the flow of solution. Generally, the total amount of inorganic salt solution delivered to the resin should correspond to about 4 to 8 pounds of the inorganic compound per cubic foot of resin. Although not indicated in the drawings, the resin is ordinarily rinsed with water prior to and subsequent to its regeneration with the alkali metal hydroxide.

The alkali metal hydroxide solution is suitably introduced at a rate corresponding to 0.5 to 5 gallons of solution per square foot of cross section of the resin per minute, to regenerate the anion exchange resin to its hydroxide form, after which the resin is washed with water to remove any excess alkali metal hydroxide. As previously mentioned, the concentration of the alkali metal hydroxide should be about 1 to 5 normal, and preferably about 3.5 to 5 normal. The amount of alkali metal hydroxide supplied to the resin should generally correspond to at least about 2 and preferably at least about 4 gram molecular equivalents of alkali metal hydroxide per gram atomic weight of chloride ions originally contained in the exhausted resin.

As previously mentioned, the method of the present invention is applicable to a wide range of strong-base anion exchange resins of the type having quaternary ammonium active groups. Commercially available examples of such a resin include Amberlite IRA-400, manufactured by Rohm & Haas Duolite A-101-D, manufactured by the Diamond Shamrock Company; and Dowex SBR, manufactured by the Dow Chemical Company.

The following example is intended to illustrate the present invention, and should not be construed as limitative, the scope of the invention being determined by the appended claims.

EXAMPLE 250 cubic feet of Amberlite IRA-400 strong-base anion exchange resin were placed in a regeneration column, and were rinsed to remove fines. A 0.75% solution of sodium sulfate having a pH of about 3.6 was delivered through the resin in a quantity sufficient to supply 10 pounds of sodium sulfate per cubic foot of resin. This sodium sulfate has been formed by neutralizing and diluting with sulfuric acid the effluent obtained in the sodium hydroxide regeneration of a previous batch of resin. The sodium sulfate was delivered at a rate of 4 gallons per minute per square foot of resin cross section (measured perpendicular to flow). After passing through the resin, the sodium sulfate was delivered to the drain.

The resin was next treated with a sodium hydroxide solution that had been recovered from the latter part of the regeneration of a previous batch of resin in the manner hereinafter described. This sodium hydroxide had a concentration of about 14% or 3.5 normal, and contained small quantities of sodium sulfate. The first 23% of the effluent flow was neutralized with sulfuric acid and delivered to the drain. The portion between 23 and 52% of the total effluent flow was neutralized with sulfuric acid and diluted to form a 0.75% solution of sodium sulfate. This sodium sulfae solution was delivered to a sodium sulfate storage tank for use in converting the next batch of resin to the sulfate form.

A total of 6250 pounds of sodium hydroxide are delivered to the resin. The first 3000 pounds were obtained from the recovering of the effluent from a previous regeneration. The latter 3250 pounds were introduced in the form of a fresh 14% solution. The sodium hydroxide was introduced at a rate of 2.5 gallons per minute per square foot of surface area, and delivered through a packed bed of the resin in a downflow direction. The effluent from the latter 3250 pounds of sodium hydroxide delivered to the resin was transferred directly to an effluent sodium hydroxide storage tank, for use in performing the initial portion of the hydroxide regeneration of a subsequent batch of resin.

One bed volume of demineralized water was next introduced into the resin at the top, and at the rate of 2.5 gallons per minute per square foot to displace the sodium hydroxide. The initial portion of this effluent was delivered to the effluent sodium hydroxide storage tank, since the effluent represents substantially pure sodium hydroxide. After about half of the demineralized water had been delivered to the bed, the effluent was neutralized and delivered to the drain.

The resin was subsequently rinsed with 75 gallons of demineralized water per cubic foot of resin at a flow rate of 4 gallons per minute per square foot of cross-sectional area. The rinsed, regenerated resin showed in exceptionally high level of regeneration, with about 97% of the ion exchange sites in the hyroxide form. Less than 1% of the sites were in the chloride form.

Obviously, many modifications and variations of the invention as hereinbefore set forth will occur to those skilled in the art, and it is intended to cover in the appended claims all such modifications and variations as fall within the spirit and scope of the invention.

We claim:

1. A method for converting strong-base anion exchange resin having quaternary ammonium active groups from the monovalent anion form to the hydroxide form comprising: passing a [solution] *source* of polyvalent anions through a first batch of said resin, whereby to displace said monovalent anions [with said polyvalent anions]; subsequently passing a solution of alkali metal hydroxide through said resin to convert said resin to the hydroxide form, and to produce an effluent solution of hydroxide anions and [divalent] *polyvalent* anions; neutralizing said effluent with an acid containing *a source of* polyvalent anions whereby to form a neutralized [solution] *source* of polyvalent anions; and passing said neutralized [solution] *source of polyvalent anions* through a second batch of said resin in the monovalent anion form.

2. The method as defined in claim 1 wherein said monovalent anion form is the chloride form.

3. The method as defined in claim 1 wherein said polyvalent anions are divalent anions.

4. The method as defined in claim 3 wherein said divalent anions are sulfate anions.

5. The method as defined in claim 1 wherein said alkali metal hydroxide is sodium hydroxide.

6. The method as defined in claim 5 wherein said sodium hydroxide has a concentration in the range of 3.5 to 5.0 normal.

7. A method for converting strong-base anion exchange resin having quaternary ammonium active groups from the monovalent anion form to the hydroxide form comprising: passing a [solution] *source* of polyvalent anions through a first batch of said resin, said solution having a concentration not exceeding about 0.5 normal, to displace said monovalent anions [with polyvalent anions]; subsequently passing a solution of alkali metal hydroxide through said resin to convert said resin to the hydroxide form and to produce an effluent comprising an alkali metal hydroxide solution; neutralizing at least a portion of said effluent with an acid containing *a source of* polyvalent anions, whereby to form a neutralized effluent [solution] *source* of polyvalent anions; and passing said neutralized effluent [solution] *source of polyvalent anions* through a second batch of said resin in the monovalent anion form whereby to displace said monovalent anions.

8. The method as defined in claim 7 wherein a first portion of said effluent is neutralized, and further comprising the steps of storing a second portion of said effluent alkali metal hydroxide solution; and passing said effluent alkali metal hydroxide solution through said second batch of resin after said neutralized effluent.

9. The method as defined in claim 8 further comprising the step of passing a fresh alkali metal hydroxide solution through said resin after said effluent alkali metal hydroxide.

10. A method for converting strong-base anion exchange resin having quaternary ammonium groups from the chloride form to the hydroxide form comprising: passing a solution of sodium sulfate having a concentration not exceeding 0.5 normal through a first batch of said resin to displace said chloride ions with sulfate ions; subsequently passing a solution of sodium hydroxide through said resin in an amount sufficient to convert said resin to the hydroxide form, and to produce an effluent comprising a solution of sodium hydroxide; neutralizing said effluent with sulfuric acid, whereby to form a neutralized effluent solution of sodium sulfate; and passing said neutralized effluent solution through a second batch of said resin to convert said second batch to the sulfate form.

11. The method as defined in claim 10 further comprising the steps of storing a second portion of said effluent sodium hydroxide solution; passing said second portion of said effluent sodium hydroxide solution through said second batch of resin after passing said neutralized effluent through said resin; and subsequently passing a fresh sodium hydroxide solution through said second batch of said resin.

* * * * *

UNITED STATES PATENT AND TRADEMARK OFFICE

CERTIFICATE OF CORRECTION

PATENT NO. : Re 29,680

DATED : June 27, 1978

INVENTOR(S) : Eli Salem, Donald J. Butterworth, Leo F. Ryan

It is certified that error appears in the above-identified patent and that said Letters Patent are hereby corrected as shown below:

Column 1, line 44, "amines" should read --anion--.

Column 2, line 52, "exchanges" should read --exchange--.

Column 3, line 9, "unit" should read --tank--.

Column 5, line 52, "sulfae" should read --sulfate--.

Column 6, line 6, "the" should read --this--.

Column 6, line 13, "in" should read --an--.

Column 6, line 21, after "within the" insert --true--.

Signed and Sealed this

*Thirty-first* Day of *October 1978*

[SEAL]

*Attest:*

RUTH C. MASON
*Attesting Officer*

DONALD W. BANNER
*Commissioner of Patents and Trademarks*